Patented Aug. 21, 1934

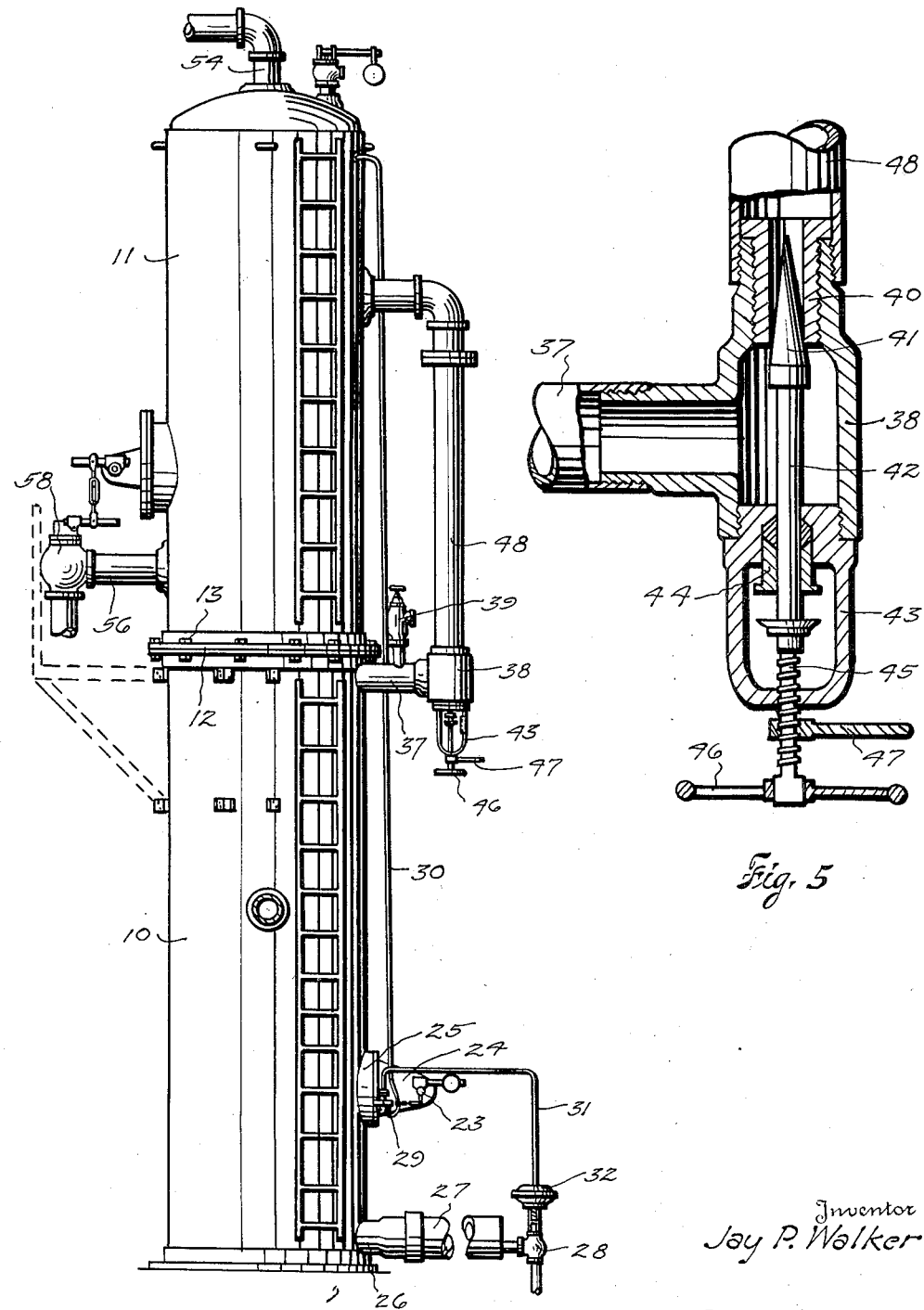

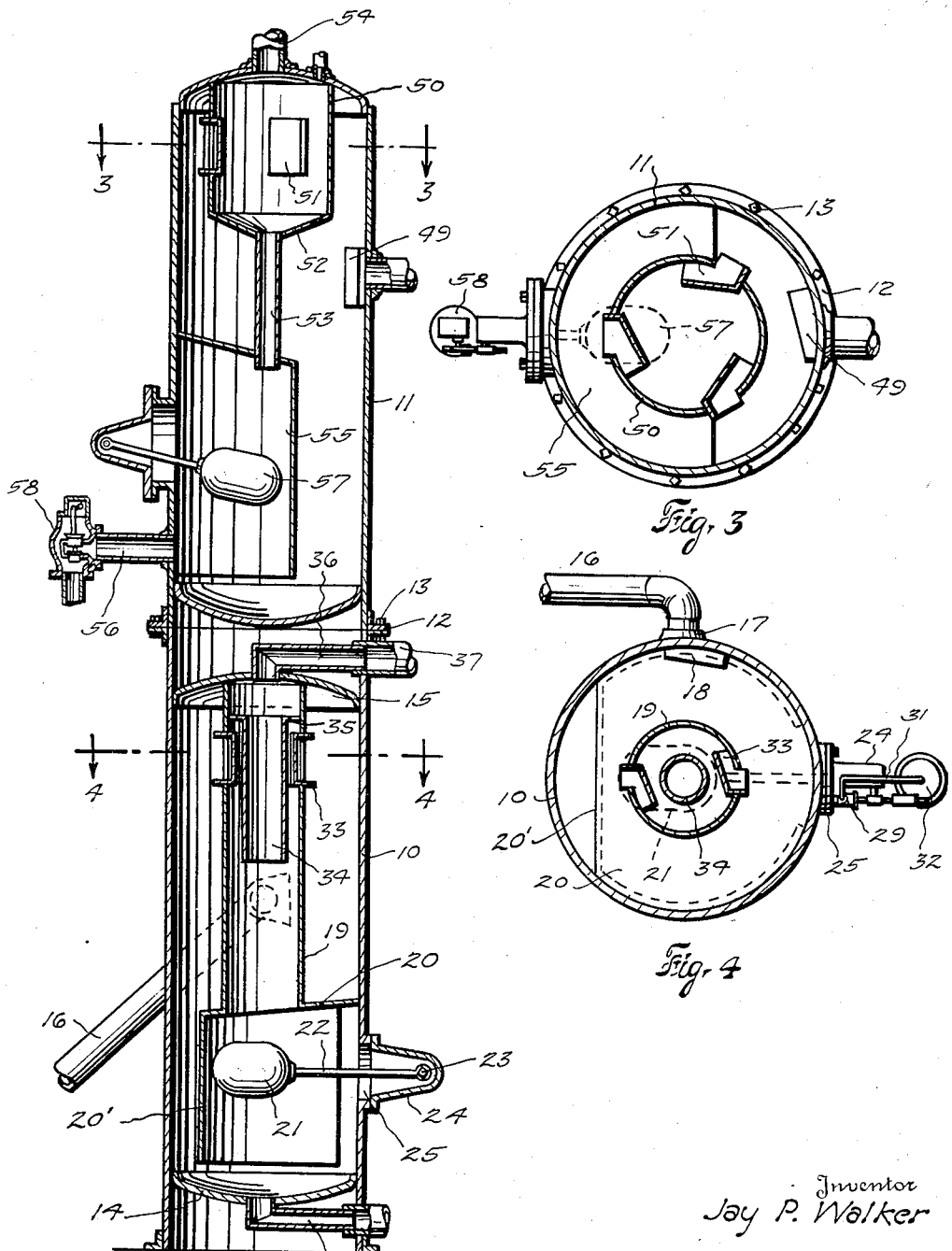

1,970,784

UNITED STATES PATENT OFFICE 1,970,784

LIQUID AND GAS SEPARATION

Jay P. Walker, Tulsa, Okla., assignor of forty per cent to Guy O. Marchant and six per cent to C. G. Wells, Tulsa, Okla.

Application April 18, 1932, Serial No. 605,945

12 Claims. (Cl. 183—2.7)

This invention relates to new and useful improvements in liquid and gas separation.

The invention has particularly to do with the separation of water, oil and gas at the well and as the mixture is discharged from the well.

It is highly desirable and more economical to flow oil from an oil well, rather than to pump or elevate it by artificial means; but to do so, a pressure must be maintained in the well, and, therefore, the liquid is produced or flowed under pressure. The majority of wells flow water as well as oil, together with the gas.

In order to conserve the gas pressure in the well it is the practice to choke the flow which is accomplished by flowing the effluent from the well through a reduced opening or a partially closed valve. With this practice there is a constant possibility of emulsification of the oil and water, which makes a later separation of these constituents very difficult and expensive.

Certain apparatuses have been developed and successfully used for preventing emulsification and for effectively separating oil, gas and water flowing from a well under pressure.

One object of my invention is to provide improved means and apparatus for separating or precipitating the water from the oil and gas while the three components are under well pressure, and without any appreciable attempt to separate the oil from the gas either at the time of the precipitation, or in the same receptacle, or prior to reducing the pressure.

A further object of the invention is to precipitate or settle the water by gravitation without any segregation of the gas and to flow the gas and oil in solution from the point of precipitation of the water to the point where the pressure is reduced.

A particular object of the invention is to conduct the oil and gas in solution and under a reduced pressure to a point of separation and there separate them.

Another object of the invention is to provide exterior means for regulating the flowing pressure under which the oil and gas pass through the first container or separator, as well as for adjusting the orifice through which the oil and gas flow from the main separating tank.

The advantages of the invention are many and among them are; rapid separation of large or small volumes; simplicity and compactness of apparatus; more effective precipitation of the water; reduction of foaming in the main separating tank; automatic discharging of the water from the main separating tank; the discharge of water and sand free from gas or gas pressure; and the elimination of numerous traps.

A further advantage of the invention is that the oil and gas, as they come from the well, being so intermixed or commingled as to flow together as long as they are kept at the same pressure, will not separate when the water is precipitated, because the oil and gas are kept constantly in motion and no space is provided in the main separating tank for separating the oil from the gas.

A construction designed to carry out the invention will be hereinafter described together with other features of the invention.

The invention will be more readily understood from a reading of the following specification and by reference to the accompanying drawings in which an example of the invention is shown, and wherein:

Figure 1 is an elevation of an apparatus for carrying out the separation in accordance with the invention, Figure 2 is a vertical sectional view of the same, Figure 3 is a horizontal cross-sectional view taken on the line 3—3 of Figure 2, Figure 4 is a horizontal cross-sectional view taken on the line 4—4 of Figure 2, and Figure 5 is an enlarged sectional view of the choke.

In the drawings the numeral 10 designates an upright water separating tank and 11, an upright gas and oil separating tank. These tanks are preferably cylindrical and the tank 11 may be mounted upon the tank 10, but this is not essential, and the invention is not to be so limited. Where the tanks are mounted as shown in Figures 1 and 2 they are secured together by flanged rings 12 fastened thereto and united by bolts 13.

The tank 10 has a false bottom 14 and a false top 15. At mid-height an influent pipe 16 connected directly to the well pipe (not shown) is secured in the collar 17 of a flared diverter 18. The collar connects through the wall of the tank with the diverter which is placed against the wall so as to turn the influent against the inner face of the wall, spread it, and direct it circumferentially on said wall around the tank. By this arrangement the influent consisting of a mixture of oil, gas and water with more or less sand is caused to whirl in the tank.

An upright cylindrical column 19 is suspended from the top 15 and connects at its lower end with a hood or shield 20. The shield 20 is made to fit the inner wall of the tank, and its top inclines to an upright front wall 20'. The liquids which fall or flow down the tank will be shed by the inclined top of the shield to the space in front of the wall 20', so as to enter said shield under the lower edge of the wall. The greater portion of the liquids in the lower portion of the tank will be water, which will seek a level both inside of and outside of the column 19, flow either from the diverter 18 or down through the column.

The float is secured on the end of an arm 22 fastened on a rock shaft 23 journaled in a bonnet 24 mounted on the manhole 25 of the tank 10. An outlet pipe 26 extends from the bottom 14 and is connected with a water trap 27 through the side wall of the tank. An outlet valve 28 controls the discharge of water from this trap. The trap may be omitted and the valve 28 connected directly to the pipe 26. The rock shaft 23 is connected with a pressure valve 29 for controlling a supply of gas pressure conducted from the top of the tank 11 by a pipe 30, or low pressure gas or air from any source may be used. A second pipe 31 leads from the valve to a diaphragm 32. When the float 21 rises above its normal level the valve 29 is opened to supply gas pressure to the diaphragm, and thus open the valve 28, whereby water is discharged from the trap 27 in the lower portion of the tank. It is not considered necessary to describe the details of the valve supplying means, which is similar to the structure shown in my Letters Patent No. 1,846,376, issued February 23, 1932. It is to be understood that any means suitable for the purpose may be employed to discharge water from the bottom of the tank 10 when the same has risen above a pre-determined level.

It is stressed that no oil and gas separation is carried out in the tank 10 and the only function of this tank is to separate the water by gravitation. The reason there will be no separation of oil and gas in the tank 10 is because so long as they are kept under the same pressure and permitted to flow, there will be no separation. The influent enters at 18 but the stream of oil and gas is constantly discharged through the valve 38 and, therefore, this stream is always moving. Theoretically the gas is confined in minute globules of oil or is so intermingled with the oil as to flow with it rather than to separate from it. There will be no tendency for the gas to collect in the top of the tank above the louvres 33 or above the lower end of the tube 34. The water being heavier than the oil and gas will, of course, precipitate downwardly. When the device is in use the tank 10 will at all times be filled to its top 15, water being collected in the lower portion and the gas and oil mixture filling the upper portion. It is presumed that most of the water will settle out and not rise in the tank. However, in order to complete the extraction of the water, louvres 33 are provided in the upper portion of the column 19 arranged to admit the liquids and gases (in solution) rising in the tank and direct the same circumferentially within the column around a depending spout 34, in accordance with their through put velocity. The spout extends some distance below the louvres, and the annular space between the spout and the column above the louvres is closed by a flange 35 fastened to the column. The influent upon entering the column through the louvres 33 is caused to whirl and pass downwardly before entering the spout, in so traveling an opportunity is given for the water to be cast out of the mixture and to settle. The oil and gas mixture will pass upwardly through the spout 34 into the upper end of the column and out through an elbow 36 leading from the top 15.

It will be seen that no space or provision is made in the top of the tank 10 for separating the oil and gas, and the latter are carried out through the pipe 36 unseparated. The path which the influent travels in passing through the tank 10 is very important because one object of the invention is to extract as much water as is possible, and to do so, without separating the oil and gas from each other. The inlet louvres 18 will give the influent a circumferential motion which tends to extract the water, owing to the differences in the natures of oil, water and gas. The fluids constantly flowing toward the outlet pipe 36 are kept in motion by the pressure of inflowing influent from the well. These fluids are carried up to the louvres 33, then down along the spout 34 and thence up to the discharge pipe 36. These up and down and centrifugal movements precipitate the water, particularly because of the particular path traveled and its length.

A discharge pipe 37 leads from the elbow 36 to the casing 38 of a choke valve, which is shown in detail in Figure 5. An ordinary safety valve 39 is connected in the pipe 37 in advance of the choke, and may be set to pop off at any desired pressure. While any suitable form of choke valve or pressure regulating means may be employed, I prefer to use the type illustrated, but do not consider the structure of the same a part of the invention. The choke valve shown may be purchased in the open market and has been found to work satisfactorily.

In the upper end of the casing 38 a valve bushing 40 is screwed and this bushing forms a seat for an elongated taper valve 41 having a stem 42. A spider 43 is screwed into the lower end of the casing and carries a stuffing box 44 through which the stem extends. The lower portion of the stem is provided with screw threads 45 which engage in the lower end of the spider. A hand wheel 46 is provided on the lower end of the stem for operating the valve. A locking lever 47 is mounted on the threads 45 and may be screwed up against the bottom of the spider to lock the stem 42 and the valve 41 in adjusted positions.

The oil and gas mixture is received in the casing 38 at well pressure, and this pressure is maintained throughout the tank 10. The valve 41 is adjusted so as to reduce the flow and thereby discharge the oil and gas mixture from the bushing 40 at a reduced pressure into an upright pipe 48, by which it is conducted to a diverter 49 in the side wall of the upper tank 11, said diverter being similar to the diverter 18.

It is pointed out that so long as water remains in the mixture an emulsification is likely to occur. By introducing the mixture from the pipe 16 into a body of liquid within the tank 10 and whirling and passing the mixture as described, full opportunity is given the water to settle or precipitate from said mixture. By passing the mixture around the tank, then upwardly through the louvres 33 and then downwardly and again upwardly through the spout 34, an elongated path is pursued, and it is obvious that this extended path is sufficient to cause the extraction of the water. The opening through which the liquids and fluids pass prior to entering the valve casing 38 are large and therefore, there is practically no reduction in the well pressure. By keeping the oil and gas intermixed and constantly flowing, no opportunity is offered for the gas to collect in the upper portion of the tank 10. It is contrary to the purpose of this invention to carry out any separation of oil and gas in the tank 10 and actual operation shows that there is no such separation. However, I wish to stress and make clear that the mixture is not separated into its constituent parts while still under well pressure, and that no attempt is made to separate the oil and gas mixture until the pressure thereon has been reduced. No space is left in the tank 10 for collecting or carrying off gas, and the sole purpose of the tank 10 is to extract the water from the influent.

It is obvious that any efficient separating device may be used to separate the oil and gas, therefore, the tank 11 and the elements thereof illustrate merely a practical separator. The oil and gas mixture is spread upon the inner wall of the tank 11 and carried circumferentially therearound in a thin film. This stream moves in a helical path, the gaseous fluids tending to rise, and the liquids traveling downwardly. A cylindrical scrubbing shell 50 is suspended from the top of the tank and provided with a plurality of louvres 51 similar to the louvres 33. The shell has a conical bottom 52 from which a drain pipe 53 extends downwardly.

The gaseous fluids passing upwardly are robbed of some of their moisture and enter the shell through the louvres 51. These louvres cause the gaseous fluids to travel circumferentially, whereby moisture is scrubbed out on the walls of the shell. The gas is carried from the top of the shell through a pipe 54 and the extracted oil drains through the pipe 53 into a shield 55 in the lower part of the tank. The oil which settles in the tank enters the open bottom of the shield and with the drained oil passes out through an outlet pipe 56. A suitable float 57 is connected with a valve 58 as is common in the art for controlling the discharge of oil.

As hereinbefore stated the separator tank 11 may be mounted separately from the tank 10 and may be of any suitable construction. I am aware that various devices have been used for precipitating water from the mixture discharged from a well. It has been my observation that in the majority of these devices, the gas is separated from the oil and water in the same receptacle. By the method herein set forth, wherein the water is extracted without separating the oil and gas and automatically dumped, a much more simple apparatus may be employed and the separation more quickly carried out. Further, a better separation of the gas and oil can be effected where the water is first taken out and the oil and gas separation performed under a lower pressure.

Various changes in the size and shape of the different parts, as well as modifications and alterations, may be made within the scope of the appended claims.

Having illustrated and described a preferred form of the invention, what I claim, is:

1. In a liquid and gas separator, an upright tank, an inlet in the side of the tank for direct connection with a well pipe, a diverter in the tank connected with the inlet for directing the influent circumferentially, a column in said tank having entrance openings in its upper portion, a spot in said column extending below the openings thereof, a conductor for oil and gas extending from the top of the column, a pressure reducer connected with said conductor, and an oil and gas separator connected with said pressure reducer.

2. In a liquid and gas separator, an upright tank, an inlet in the side of the tank for direct connection with a well pipe, a diverter in the tank connected with the inlet for directing the influent circumferentially, a column in said tank having entrance openings in its upper portion, a spout in said column extending below the openings thereof, a conductor for oil and gas extending from the top of the column, a pressure reducer connected with said conductor, an oil and gas separator connected with said pressure reducer, and means for automatically dumping water from the bottom of the tank.

3. The method of extracting water from oil, gas and water-well mixtures which consists, in conducting the mixture under well pressure from the well, extracting the water by whirling the mixture and moving it in up and down paths, whereby the water is precipitated and separated by gravity and the oil and gas are maintained in solution, and then carrying off the oil and gas in solution.

4. The method of extracting water from oil, gas and water mixtures flowing from a well under well pressure which consists, in settling out the water and holding the gas and oil under sufficient pressure to maintain them in solution, flowing said gas and oil in solution from the point of water separation while under said pressure, reducing the pressure on the flowing oil and gas, and then separating the oil and gas.

5. In the art of treating well fluids, the steps of flowing the fluids under pressure from the well into a chamber, maintaining said fluids under a sufficient pressure in said chamber to hold the oil and gas in solution while settling out the water by gravitation, causing a discharge of the oil and gas still in solution from said chamber, and reducing the pressure on said oil and gas after discharge from said chamber.

6. In the art of treating well fluids, the steps of flowing the fluids under pressure from the well into a chamber, maintaining said fluids under a sufficient pressure in said chamber to hold the oil and gas in solution while settling out the water by gravitation, causing a discharge of the oil and gas still in solution from said chamber, reducing the pressure on said oil and gas after discharge from said chamber, and separating the oil from the gas.

7. In the art of treating well fluids, the steps of flowing the fluids under pressure from the well into a chamber, directing the fluids in circumferential paths as well as in up and down paths in said chamber to scrub out the water, maintaining the oil and gas under sufficient pressure while travelling said paths to hold them in solution, causing a discharge of water from said chamber free from oil, causing a discharge of the oil and gas from said chamber while still in solution, reducing the pressure on the flowing oil and gas, and causing the separation of the oil and gas in a separate chamber.

8. The method of separating oil, gas and water which consists in conducting the components under well pressure from the well, whirling said components and settling out the water by gravitation from the body of components while flowing the oil and gas under sufficient pressure to maintain them in solution, then flowing substantially all of the oil and gas from the point of water-separation and still in solution, reducing the pressure on the flowing oil and gas to promote separation, and then separating the oil and gas.

9. The method of separating oil, gas and water which consists in conducting the components under well pressure from the well, flowing said components in a circuitous path and settling out the water by gravitation from the body of components while flowing the oil and gas under sufficient pressure to maintain them in solution, then flowing substantially all of the oil and gas from the point of water-separation and still in solution, reducing the pressure on the flowing oil and gas to promote separation, and then separating the oil and gas.

10. In a liquid and gas separator, an upright tank, an inlet in the side of the tank for direct connection with a well pipe, a water outlet at the bottom of the tank, a conductor located at the top of said tank and extending therefrom for carrying off substantially all of the oil and gas from said tank, a pressure reducer adapted to be set to maintain a substantially fixed pressure connected to said conductor, and an oil and gas separator connected with said conductor.

11. In a liquid and gas separator, an upright tank, an inlet in the side of the tank for direct connection with a well pipe, a water outlet at the bottom of the tank, baffle means in the tank located to cause the liquids and fluids flowing therethrough to pursue an extended path for extracting the water therefrom, a conductor located at the top of said tank and extending therefrom for carrying off substantially all of the oil and gas from said tank, a pressure reducer adapted to be set to maintain a substantially fixed pressure connected to said conductor, and an oil and gas separator connected with said conductor.

12. In a liquid and gas separator, an upright tank, an inlet in the side of the tank for direct connection with a well pipe, a water outlet at the bottom of the tank, a conductor located at the top of said tank and extending therefrom for carrying off substantially all of the oil and gas from said tank, a choke valve adapted to be set to maintain a substantially fixed pressure connected to said conductor, and an oil and gas separator connected wtih said conductor.

JAY P. WALKER.